Jan. 4, 1927.
E. E. GREVE
1,612,974
ROTARY FOR EARTH BORING
Filed June 1, 1923
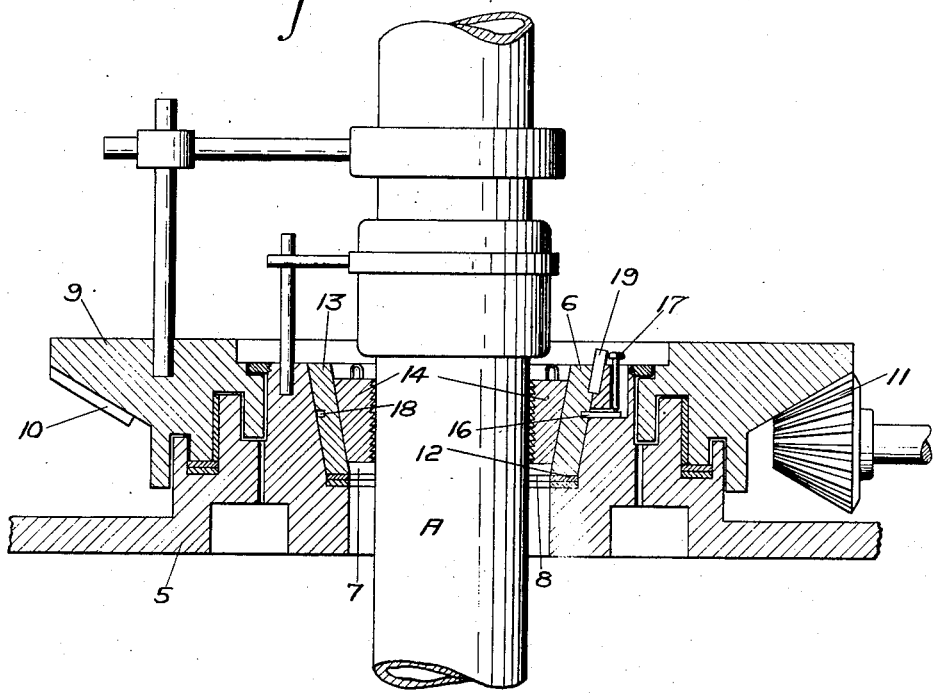
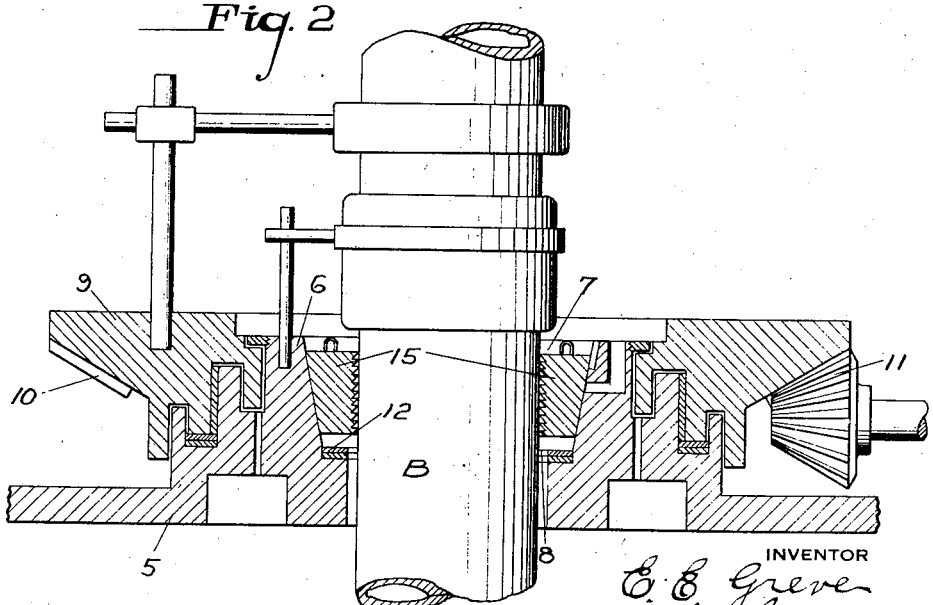
INVENTOR
E. E. Greve
by W. G. Doolittle
Attorney.

Patented Jan. 4, 1927.

1,612,974

UNITED STATES PATENT OFFICE.

EDGAR E. GREVE, OF BELLEVUE, PENNSYLVANIA.

ROTARY FOR EARTH BORING.

Application filed June 1, 1923. Serial No. 642,788.

This invention is for a rotary for earth boring, and relates to that type of rotary capable of use in connection with the screwing up or unscrewing of pipe joints or cable sections, as well as for rotating the drilling tool.

The invention relates to an improvement on the rotary shown in my co-pending application Serial No. 632,032, filed April 14, 1923, and has for its object to provide a rotary as therein shown, with a conical central opening to receive a slip holding spider which has a conical exterior, the advantage being that when exceptionally large diameters of pipe or casing are being handled, the spider may be removed and slips inserted directly in the conical opening in the base.

The invention may be readily understood by reference to the accompanying drawings, in which:

Fig. 1 is a transverse vertical section through a rotary constructed in accordance with my invention, showing the slip engaging spider in use; and Fig. 2 is a similar view showing the spider removed and the slips applied directly to the walls of the opening in the base.

As pointed out in my co-pending application, it is highly desirable, wherever possible, to have the slips received in a rotatable spider. The present invention proposes to provide a structure wherein this advantage may normally be maintained, but which, however, is sacrificed where relatively large diameters of pipe are being handled.

In the drawings, 5 designates a metal base having a relatively high central part 6 through which is a conical central opening 7, a shoulder being formed in the opening at 8, the opening below shoulder 8 being of a constant diameter which is less than the diameter of any point in the conical opening. Part 6 is ribbed and grooved, as shown and as described in my co-pending application herein referred to, and supports a rotary table 9 having concentric ribs and grooves interfitting with those on the base. The table carries an annular gear 10 and may be rotated through driving pinion 11.
Mounted on the shoulder 8 are bearing rings 12, and removably inserted in opening 7 is a spider 13 having a conical exterior and a conical interior opening, the spider being rotatably supported on rings 12.

Slips 14 may be inserted in the spider to engage pipe A, as shown in Fig. 1.

Where pipes of relatively large diameter are being handled, there is not sufficient room for both the slips and the rotatable slip carrying spider. While, for the sake of saving pipe, the rotatable spider offers a considerable advantage, as fully described in my aforesaid application, yet, where large pipes are being engaged, this spider may be removed, and slips 15 are inserted directly in the opening 7 in the base, as shown in Fig. 2, thereby enabling pipes B, of a diameter considerably greater than A, to be supported.

The spider is rotatably and releasably retained against removal by a reciprocable pin 16 operable through handle 17 in such manner that its end may be projected into annular groove 18, as also fully described in my aforesaid application.

A key 19 removably inserted in registering key slots in the spider and base, serves, when necessary, as pointed out in my aforesaid application, to lock the spider against rotation.

The improvement of the present construction over that shown in my aforesaid application consists in so making the spider and the opening in which it is received that slips may be used in conjunction with the spider, or the spider removed and slips used without the spider.

Various changes and departures may be made from the construction shown within the contemplation of my invention and within the scope of the appended claim.

What I claim is:

In a rotary, a base having a relatively high central portion formed with a conical bore, a rotary table carried on the base and hav ng a central opening registering with the conical bore, and a slip carrying spider having a conical exterior and a tapered interior rotatably mounted in the conical bore, said conical exterior and the said tapered interior being of the same inclination.

In testimony whereof I affix my signature.

EDGAR E. GREVE.